(12) United States Patent
Deprauw et al.

(10) Patent No.: US 12,514,164 B2
(45) Date of Patent: Jan. 6, 2026

(54) ADJUSTMENT ARRANGEMENT FOR A SIEVE IN AN AGRICULTURAL HARVESTER

(71) Applicant: CNH Industrial America LLC, New Holland, PA (US)

(72) Inventors: Jonas Deprauw, Lauwe (BE); Michiel Vanderstichele, Merkem (BE); Kris Vanhee, Deinze (BE)

(73) Assignee: CNH Industrial America LLC, New Holland, PA (US)

( * ) Notice: Subject to any disclaimer, the term of this patent is extended or adjusted under 35 U.S.C. 154(b) by 876 days.

(21) Appl. No.: 17/747,533

(22) Filed: May 18, 2022

(65) Prior Publication Data
US 2022/0369562 A1 Nov. 24, 2022

(30) Foreign Application Priority Data

May 21, 2021 (EP) .................................. 21175433

(51) Int. Cl.
*A01F 12/44* (2006.01)
*A01F 12/56* (2006.01)

(52) U.S. Cl.
CPC ............ *A01F 12/448* (2013.01); *A01F 12/56* (2013.01)

(58) Field of Classification Search
CPC ...... A01F 12/448; A01F 12/446; A01F 12/56; A01D 41/12; A01D 41/1252; A01D 41/127; A01D 41/1276
See application file for complete search history.

(56) References Cited

U.S. PATENT DOCUMENTS 4,711,253 A * 12/1987 Anderson .......... A01D 41/1243
56/13.3
6,379,243 B1 4/2002 Schumacher et al.
(Continued)

FOREIGN PATENT DOCUMENTS

EP 2145528 A1 1/2010
EP 2796032 A2 10/2014
(Continued)

OTHER PUBLICATIONS

Extended European Search Report for European Application No. 21175433.8, dated Nov. 8, 2021, 8 pages.

*Primary Examiner* — Joseph M Rocca
*Assistant Examiner* — Douglas J Meislahn
(74) *Attorney, Agent, or Firm* — Buchanan Ingersoll & Rooney PC

(57) ABSTRACT

A sieve for use in an agricultural harvester includes a framework with a pair of opposed side members, and a first cross member extending between the side members at one end of the side members. A plurality of louvres extend between the pair of opposed side members. A pair of adjustment laths are respectively associated with and movable generally parallel to the side members, with each of the adjustment laths also being connected with the plurality of louvres. The sieve has an adjustment arrangement positioned below the plurality of louvres. The adjustment arrangement includes an actuator and a frame. One end of the actuator is connected to the first cross member and the other end of the actuator is connected to the frame. The frame has a pair of outboard ends with each of the outboard ends being connected to a respective one of the adjustment laths.

15 Claims, 5 Drawing Sheets

(56) References Cited

U.S. PATENT DOCUMENTS

| | | | |
|---|---|---|---|
| 2014/0162737 A1* | 6/2014 | Stan ........................ | A01F 12/44 460/1 |
| 2017/0020074 A1* | 1/2017 | Reinecke .............. | A01F 12/448 |
| 2018/0288940 A1 | 10/2018 | Meschke et al. | |
| 2022/0124983 A1* | 4/2022 | Andersen .............. | A01F 12/448 |
| 2023/0015715 A1* | 1/2023 | Andersen ............... | A01D 75/28 |

FOREIGN PATENT DOCUMENTS

| | | | | |
|---|---|---|---|---|
| EP | 3400784 A1 | 11/2018 | | |
| WO | WO-2019072741 A1 * | 4/2019 | ............. | B06B 1/165 |

\* cited by examiner

ADJUSTMENT ARRANGEMENT FOR A SIEVE IN AN AGRICULTURAL HARVESTER

CROSS-REFERENCE TO RELATED APPLICATION

This application claims priority to European Patent Application No. 21175433.8, filed May 21, 2021, the content of such application being incorporated by reference herein in its entirety.

BACKGROUND OF THE INVENTION

1. Field of the Invention

The present disclosure relates to a cleaning system used in an agricultural harvester, such as a combine, and, more particularly, to a sieve used in such a cleaning system.

2. Description of the Related Art

An agricultural harvester combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

A sieve typically includes a plurality of louvres extending cross-wise between the sides of the sieve, with the louvres including a plurality of fingers which are attached at their rear edge to respective wires. The louvres can be rotated, which in turn opens and closes the spacing between the adjacent rows of fingers. Depending on the crop being harvested, size of the kernels, amount of non-crop matter, etc, the louvre spacing (between the fingers) may need to be adjusted during operation. To that end, the louvres can be connected to at least one adjustment lath which can be moved forward and rearward. The adjustment lath can be connected by way of hinges, levers, etc. to a manual adjustment mechanism, such as a lever at the rear of the sieve which allows an operator to manually adjust the louvre spacing. Wider sieves require more than one adjustment lath that needs accurate synchronization. Efforts to automate the adjustment of the louvre spacing has typically resulted in the addition of more levers, linkages, etc., which in turn has led to complication in the design, possible undesirable stackup of tolerances in the adjustment arrangement, air flow disturbances and dust collecting features.

SUMMARY OF THE INVENTION

The present disclosure provides an adjustment arrangement for a sieve with a linear actuator which is connected with and results in direct linear movement of the adjustment laths, thereby adjusting the spacing between the louvres.

The disclosure in one form is directed to a sieve for use in an agricultural harvester. The sieve includes a framework with a pair of opposed side members, and a first cross member extending between the side members at one end of the side members. A plurality of louvres extend between the pair of opposed side members. A pair of adjustment laths are respectively associated with and movable generally parallel to the side members, with each of the adjustment laths also being connected with the plurality of louvres. The sieve is characterized by an adjustment arrangement positioned below the plurality of louvres. The adjustment arrangement includes an actuator and a frame. One end of the actuator is connected to the first cross member and the other end of the actuator is connected to the frame. The frame has a pair of outboard ends with each of the outboard ends being connected to a respective one of the adjustment laths.

In another embodiment, the frame has a generally triangular configuration with a first leg defining the outboard ends of the frame, and the actuator is connected to an approximate midpoint of the first leg.

In another embodiment, the triangular configuration of the frame has an apex opposite the first leg, and the apex is positioned upstream relative to a direction of airflow through the sieve during operation.

In another embodiment, the frame has a second leg and a third leg defining the apex, at an obtuse angle therebetween, with the second leg and the third leg directing dust toward the opposed side members of the frame during operation.

In yet another embodiment, the actuator comprises an electric screw-type actuator.

In yet another embodiment, the actuator is a linear actuator.

In a further embodiment, operation of the adjustment arrangement using the linear actuator results in direct linear movement of the adjustment laths.

In a further embodiment, the frame includes at least one cut-out to reduce weight and avoid disturbance of air flow through the sieve during operation.

In a still further embodiment, the frame has a generally triangular configuration with a first leg, a second leg and a third leg, the first leg defining the outboard ends of the frame, the second leg and the third leg defining an apex, the actuator being connected to the apex of the frame.

In a yet further embodiment, the frame is comprised of cast aluminum for weight reduction and strength.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
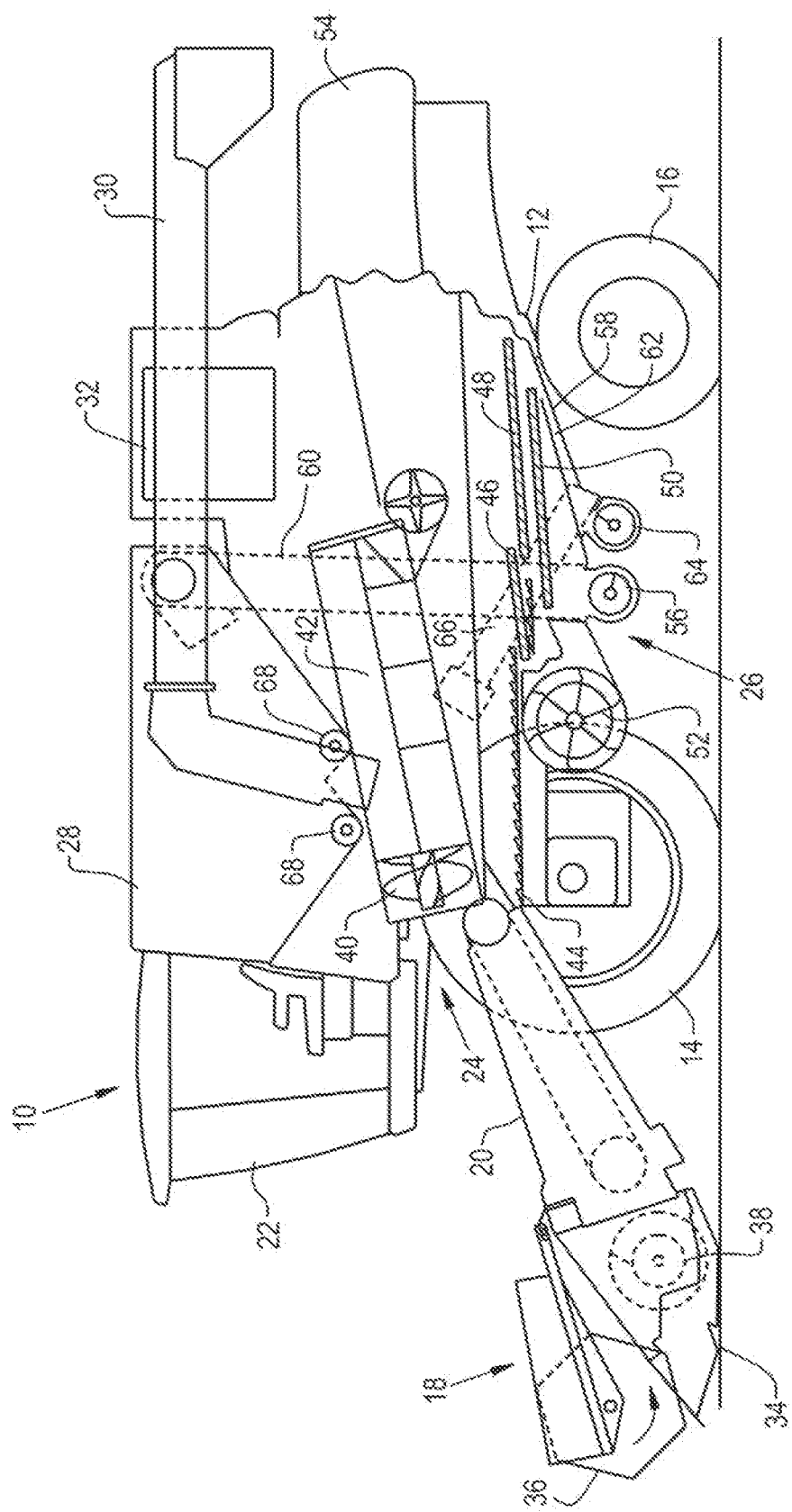
FIG. 1 is a side view of an embodiment of an agricultural harvester in the form of a combine which may include a cleaning system of the present disclosure.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. The upper sieve 48 and lower sieve 50 can be carried within a common framework, and are generally designated together as sieve assembly 110, which will be described in more detail hereinafter. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
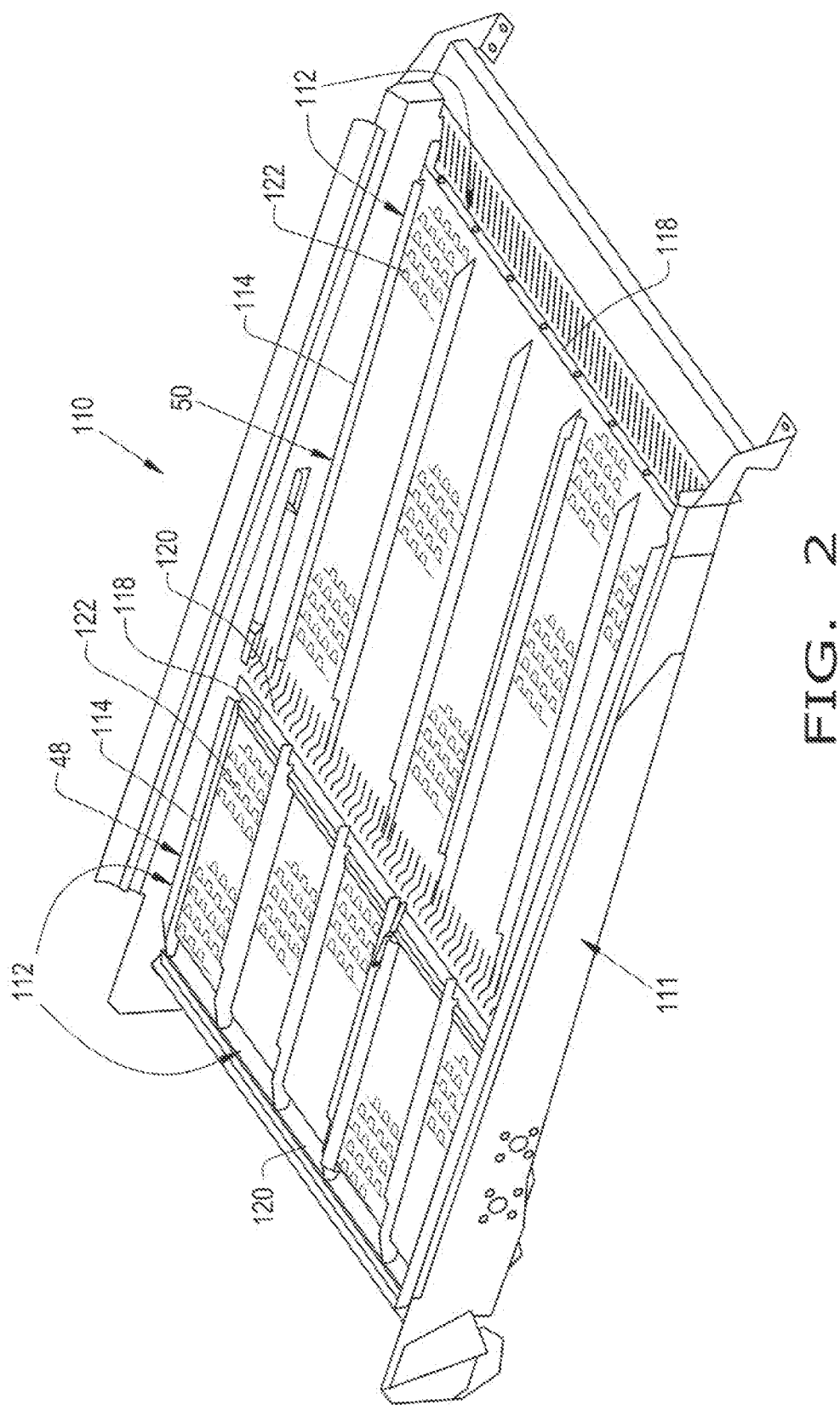
FIG. 2 is a perspective view of an embodiment of a sieve of the present disclosure which can be used in the harvester of FIG. 1.
Figure 3:
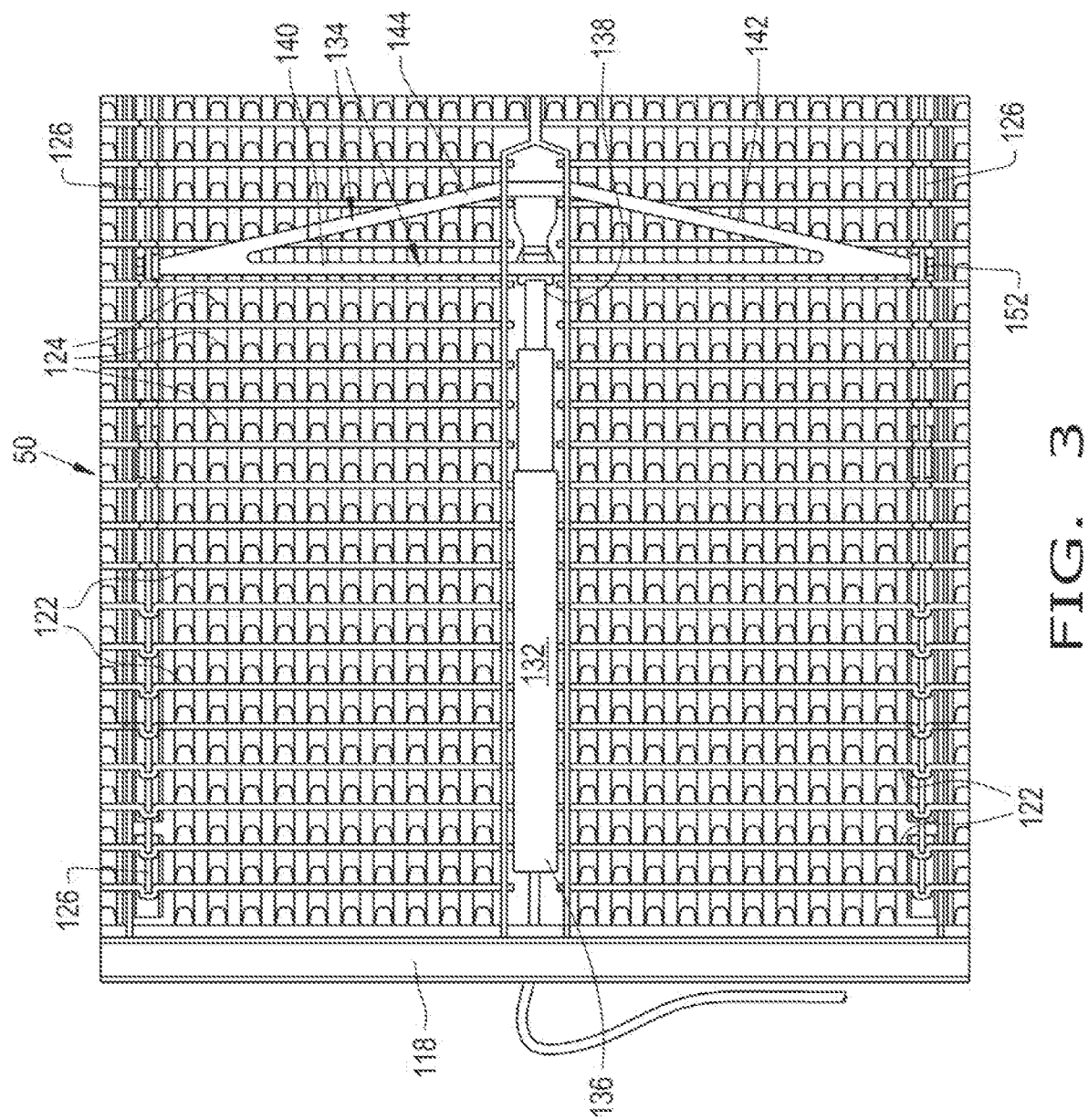
FIG. 3 is a bottom view of a portion of the sieve shown in FIG. 2, illustrating an embodiment of an adjustment arrangement of the present disclosure.

Referring now to FIGS. 2 and 3, the sieve assembly 110 includes a cleaning shoe 111 in which the upper sieve 48 and lower sieve 50 can be removably installed. The upper sieve 48 and lower sieve 50 each generally include a framework 112 with a pair of opposed side members 114 (only one of which is visible for each sieve 48, 50 in FIG. 2). A first cross member 118 extends between the side members 114 at one end of the side members 114 and a second cross member 120 extends between the side members 114 at an opposite end of the side members 114. In the embodiment shown, the first cross member 118 is positioned at the downstream end of the sieve 48 or 50, and the second cross member 120 is positioned at the upstream end of the sieve 48 or 50.

The upper sieve 48 and the lower sieve 50 each include a plurality of louvres 122 (FIGS. 2 and 3; sometimes also referred to as wires) which extend between the pair of opposed side members 114. The louvres 122 are pivotally mounted at opposite ends to the side members 114. Each louvre 122 includes a plurality of fingers 124 which overlap relative to and can be offset from the fingers 124 of adjacent louvres. The spacing between the fingers 124 of adjacent louvres can be adjusted by simultaneously rotating the louvres within the side members 114.

A pair of adjustment laths 126 are respectively positioned laterally within and next to a respective side member 114. Each of the adjustment laths 126 is associated with and movable generally parallel to a respective one of the side members 114. Each of the adjustment laths 126 is also connected with the plurality of louvres 122.

Figure 4:
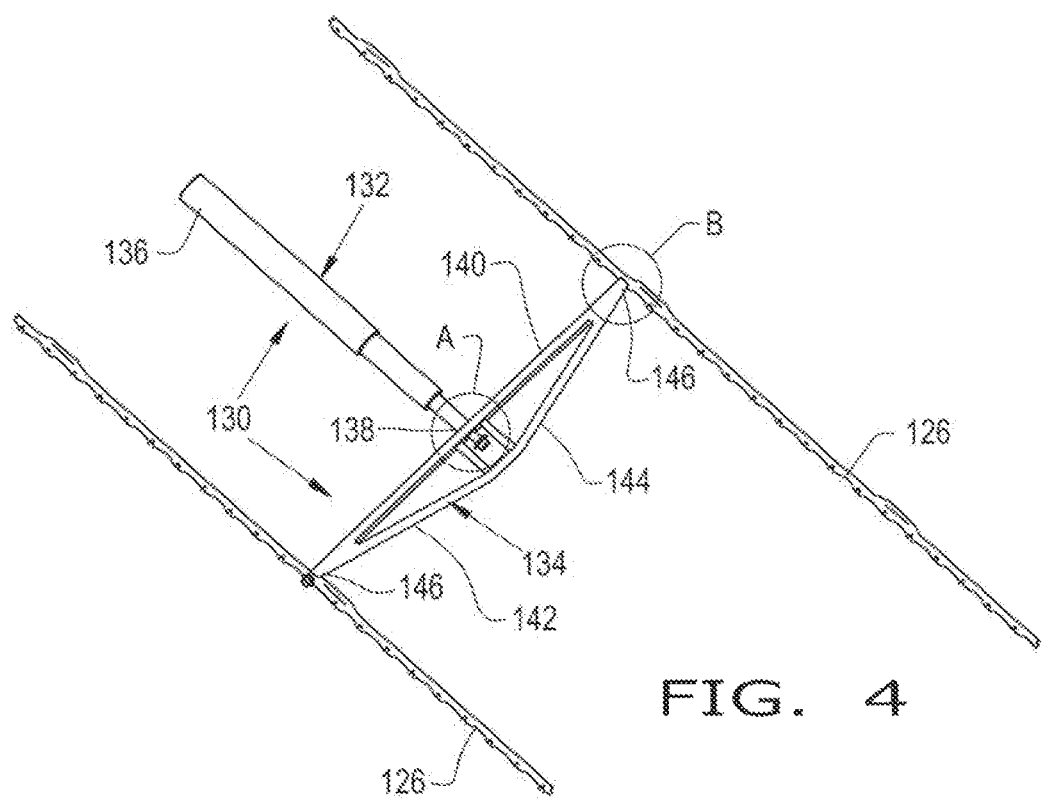
FIG. 4 is a perspective view of the adjustment arrangement shown in FIG. 3, attached to a pair of adjustment laths.

The lower sieve 50 includes an adjustment arrangement 130 which is positioned below the plurality of louvres 122. The adjustment arrangement 130 includes an actuator 132 and a frame 134. The actuator 132 is connected at one end 136 with the first cross member 118 and is connected at an opposite end 138 with the frame 134 (see FIGS. 3 and 4). In the illustrated embodiment, the actuator 132 is configured as a linear actuator, such as an electric screw-type actuator. Other types of linear actuators may also be possible, such as an electric over fluid cylinder, etc.

Figure 5:
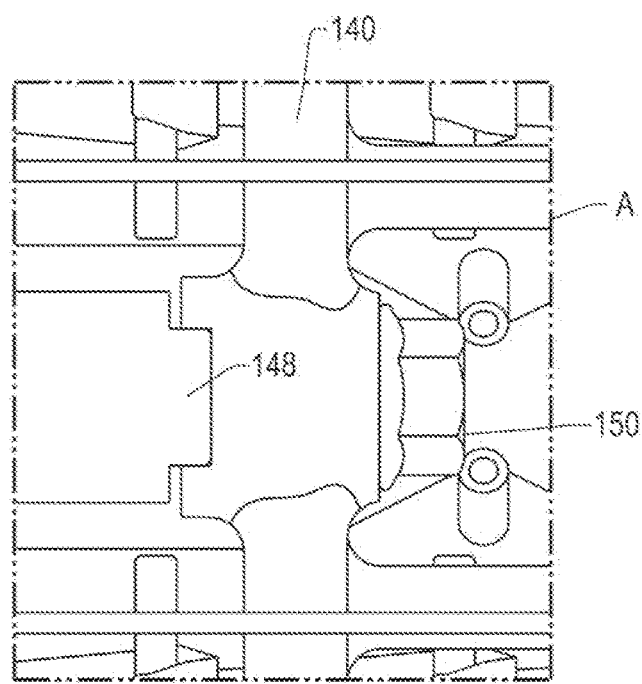
FIG. 5 is a detailed view taken at detail A shown in FIG. 4.
Figure 6:
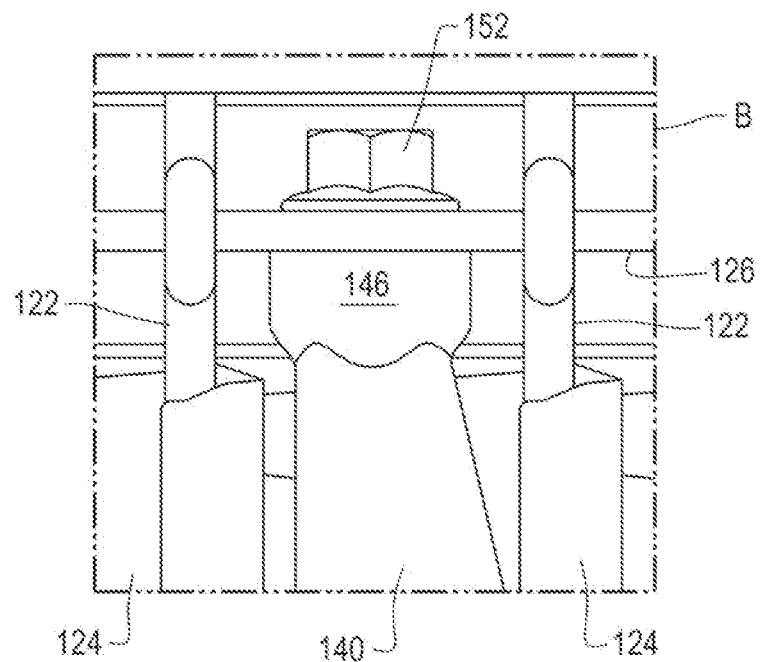
FIG. 6 is a detailed view taken at detail B shown in FIG. 4.

The frame 134 has a generally triangular configuration with a first leg 140, a second leg 142 and a third leg 144. The first leg 140 defines outboard ends 146 of the frame 134. The actuator 132 is connected to an approximate midpoint of the first leg 140. Referring to FIG. 5, the end 138 of the actuator 132 can be coupled to the frame first leg 140 using a keyed end 148 and bolt 150. Other methods of coupling the actuator 132 with the first leg 140 are also possible. Each of the outboard ends 146 of the first leg 140 are connected to a respective one of the adjustment laths 130. Referring to FIG. 6, the outboard ends 146 can be coupled with a respective adjustment lath 126 using a bolt 152, or other suitable connections.

The second leg 142 and the third leg 144 define an apex 148 of the frame 134 which is opposite from the first leg 140. The apex 148 is positioned upstream relative to a direction of airflow through the sieve assembly 110 during operation. The second leg 142 and the third leg 144 define at an obtuse angle therebetween, with the second leg and the third leg directing dust in a laterally outward direction toward the opposed side members 114 of the frame 112 during operation. First leg 140, second leg 142, third leg 144 and actuator 132 are designed to lack dust collecting features so that in use the dust is not stacking up.

During operation, the actuator 132 can be manually or automatically operated to thereby result in linear extension or retraction of the actuator 132. Linear movement of the actuator 132 in turn causes linear movement of the frame 134. The frame is connected at its outboard ends 146 with the respective adjustment laths 126, and thus simultaneously moves the adjustment laths in a fore or aft direction a desired amount. The adjustment laths 126 cause accurate simultaneous rotation of the louvres within the side members 114 which in turn adjusts the spacing between the fingers 124. As the air flows through the sieve assembly 110, the cutout defined between the first leg 140, second leg 142 and third leg 144 avoids disturbance of the air flow through the sieve and further reduces the weight of adjustment arrangement 130.

Figure 7:
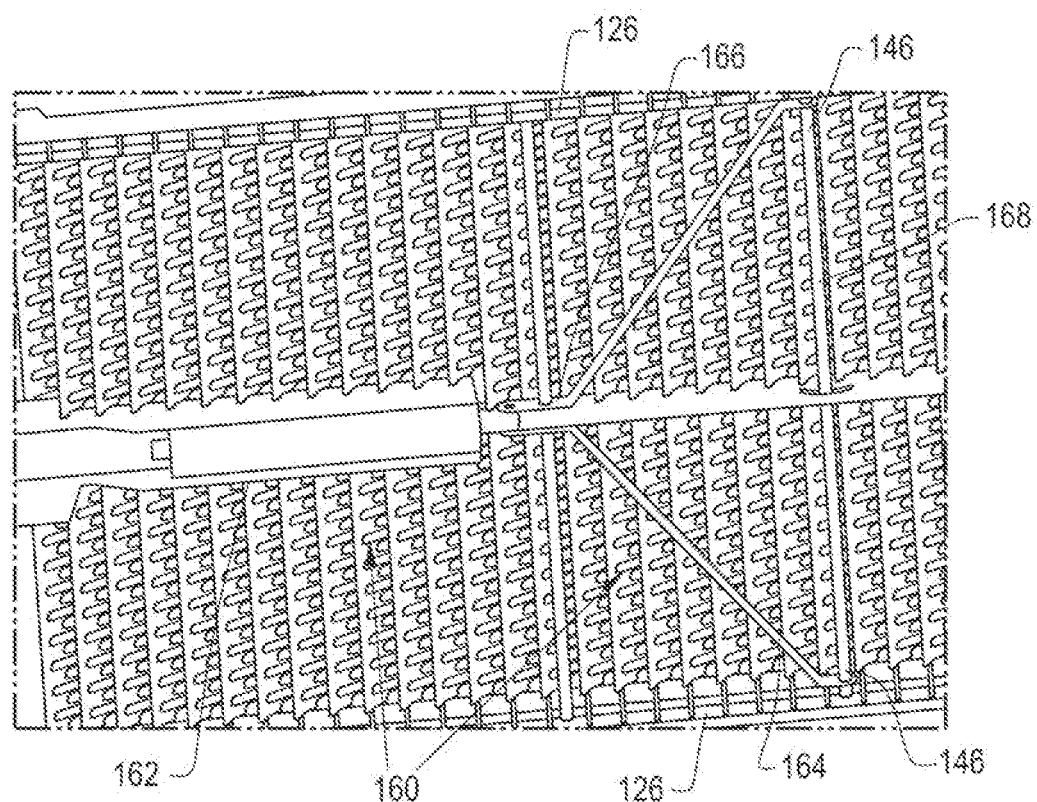
FIG. 7 is a bottom view of another embodiment of an adjustment arrangement of the present disclosure.

Referring now to FIG. 7, there is shown another embodiment of an adjustment arrangement 160 the present disclosure. Similar to the embodiment of the adjustment arrangement 130 shown in FIGS. 2-6, the adjustment arrangement 160 includes an actuator 162 and a triangular shaped frame 164. However, the actuator 162 is connected to the apex 166 of the triangular frame 164, rather than the opposing first leg 168. Other aspects of the frame 164 can otherwise remain the same as described above with respect to the embodiment of the adjustment arrangement 130.

According to the present disclosure, the frame of the adjustment arrangement 130, 160 can be formed from cast aluminum for weight reduction and strength. The frame can also include one or more cut-outs to reduce weight and avoid interference with airflow through the sieve. The actuator can be coupled with the first leg of the frame, opposite the apex, to direct the airflow laterally outward toward the side members of the frame. Operation of the adjustment arrangement using the linear actuator results in direct linear movement of the adjustment laths, thereby providing a simple adjustment arrangement with few parts and few tolerance stack ups.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve for use in an agricultural harvester, the sieve comprising:
   a framework including a pair of opposed side members, and a first cross member extending between the side members at one end of the side members;
   a plurality of louvres extending between the pair of opposed side members;
   a pair of adjustment laths, each of the adjustment laths being associated with and movable generally parallel to a respective one of the side members, each of the adjustment laths also being connected with the plurality of louvres for moving the plurality of louvres; and an adjustment arrangement positioned below the plurality of louvres, the adjustment arrangement including an actuator and a frame, one end of the actuator being connected to the first cross member and the other end of the actuator being connected to the frame, the frame having a pair of outboard ends with each of the outboard ends being connected to a respective one of the adjustment laths, wherein the adjustment arrangement frame is positioned in an air flow stream and at a location (i) below the plurality of louvres and (ii) between upstream and downstream ends of the framework as viewed in a direction of the air flow stream, wherein the adjustment arrangement frame includes at least one cut-out through which the air flow stream can pass to reduce weight and avoid disturbance of the air flow stream through the sieve during operation.

2. The sieve of claim 1, wherein the frame has a generally triangular configuration with a first leg defining the outboard ends of the frame, and the actuator being connected to an approximate midpoint of the first leg.

3. The sieve of claim 2, wherein the triangular configuration of the frame has an apex opposite the first leg, and the apex is positioned upstream relative to a direction of airflow through the sieve during operation.

4. The sieve of claim 3, wherein the frame has a second leg and a third leg defining the apex, at an obtuse angle therebetween, with the second leg and the third leg being configured to direct dust toward the opposed side members of the framework during operation.

5. The sieve of claim 1, wherein the actuator comprises an electric screw-type actuator.

6. The sieve of claim 1, wherein the actuator is a linear actuator.

7. The sieve of claim 6, wherein operation of the adjustment arrangement using the linear actuator results in direct linear movement of the adjustment laths.

8. The sieve of claim 1, wherein the frame has a generally triangular configuration with a first leg defining the outboard ends of the frame, and an apex opposite the first leg, the actuator being connected to the apex of the frame.

9. The sieve of claim 1, wherein the frame is comprised of cast aluminum.

10. An agricultural harvester comprising the sieve of claim 1.

11. A method of operating a sieve in an agricultural harvester, comprising using the adjustment arrangement recited in claim 1.

12. The sieve of claim 1, wherein the outboard ends are each positioned at a longitudinal location that is spatially defined between two adjacent louvers of the plurality of louvres.

13. A sieve for use in an agricultural harvester, the sieve comprising:

a framework including a pair of opposed side members, and a first cross member extending between the side members at one end of the side members;

a plurality of louvres extending between the pair of opposed side members;

a pair of adjustment laths, each of the adjustment laths being associated with and movable generally parallel to a respective one of the side members, each of the adjustment laths also being connected with the plurality of louvres; and an adjustment arrangement positioned below the plurality of louvres, the adjustment arrangement including an actuator and a frame, one end of the actuator being connected to the first cross member and the other end of the actuator being connected to the frame, the frame having a pair of outboard ends with each of the outboard ends being connected to a respective one of the adjustment laths, wherein the frame has a generally triangular configuration with a first leg defining the outboard ends of the frame, wherein the triangular configuration of the frame has an apex opposite the first leg, wherein the frame has a second leg and a third leg defining the apex, at an obtuse angle therebetween, with the second leg and the third leg being configured to direct dust toward the opposed side members of the framework during operation, wherein the actuator is connected to either the first leg or the apex.

14. An agricultural harvester comprising the sieve of claim 13.

15. The sieve of claim 13, wherein the frame includes at least one cut-out to reduce weight and avoid disturbance of air flow through the sieve during operation.

* * * * *